United States Patent
Shintome

(10) Patent No.: US 7,612,766 B2
(45) Date of Patent: Nov. 3, 2009

(54) PORTABLE TERMINAL DEVICE

(75) Inventor: Junichi Shintome, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 433 days.

(21) Appl. No.: 11/386,963

(22) Filed: Mar. 22, 2006

(65) Prior Publication Data
US 2006/0284855 A1    Dec. 21, 2006

(30) Foreign Application Priority Data
Jun. 17, 2005    (JP) .............................. 2005-178031

(51) Int. Cl.
*G09G 5/00*    (2006.01)
(52) U.S. Cl. ................. 345/173; 455/575.3; 455/550.1; 455/90.3; 455/566
(58) Field of Classification Search ................. 345/173; 348/207; 455/575.3, 566, 556, 90.3, 550.1
See application file for complete search history.

(56) References Cited

U.S. PATENT DOCUMENTS

| | | | | |
|---|---|---|---|---|
| 7,369,872 | B2* | 5/2008 | Lee et al. ................. | 455/550.1 |
| 2003/0064758 | A1* | 4/2003 | Mizuta et al. ............... | 455/566 |
| 2003/0203747 | A1* | 10/2003 | Nagamine ................. | 455/575.3 |
| 2004/0102211 | A1* | 5/2004 | Ishida ...................... | 455/550.1 |
| 2004/0203532 | A1* | 10/2004 | Mizuta ...................... | 455/90.3 |
| 2005/0110874 | A1* | 5/2005 | Song ..................... | 348/207.99 |
| 2006/0010699 | A1* | 1/2006 | Tamura .................... | 33/355 R |

FOREIGN PATENT DOCUMENTS

| | | |
|---|---|---|
| JP | 2000-332866 A | 11/2000 |
| JP | 2004-164375 A | 6/2004 |
| JP | 2005-012493 A | 1/2005 |
| JP | 2005-159470 A | 6/2005 |

\* cited by examiner

*Primary Examiner*—Charles N Appiah
*Assistant Examiner*—Michael T Vu
(74) *Attorney, Agent, or Firm*—Frishauf, Holtz, Goodman & Chick, P.C.

(57) ABSTRACT

A portable terminal device comprises an input device configured to receive an input operation on a plurality of positions, the input device allocating a function to be executed to the plurality of positions by an input operation, a sensor configured to detect a posture of the portable terminal device, and a control unit configured to allow the function to be changed according to the posture of the portable terminal device detected by the sensor.

17 Claims, 11 Drawing Sheets

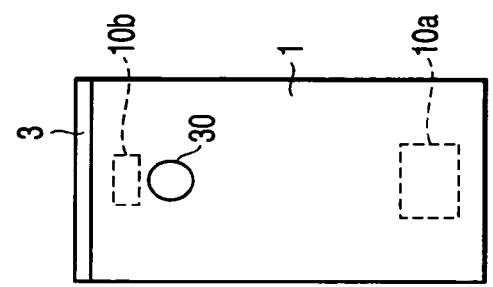
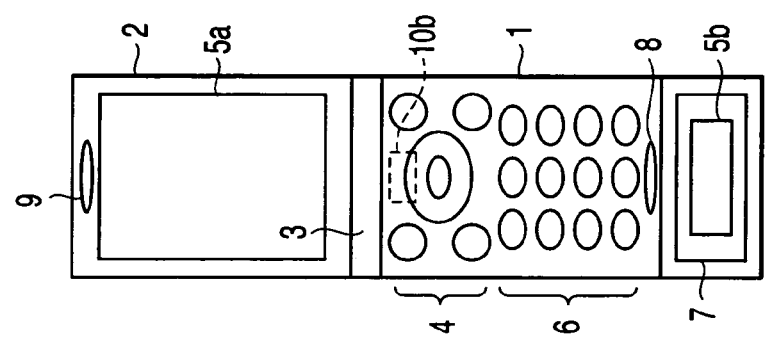
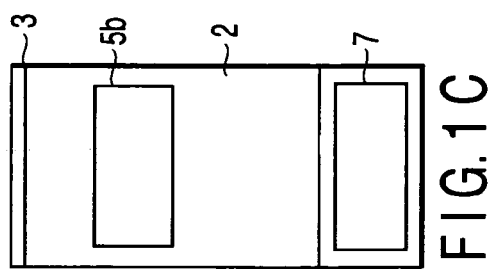
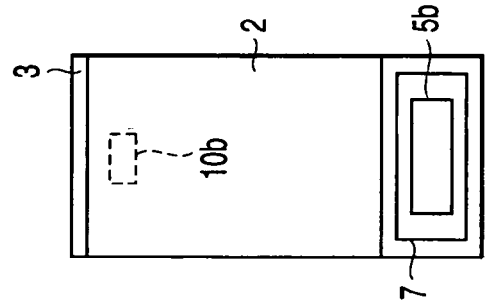
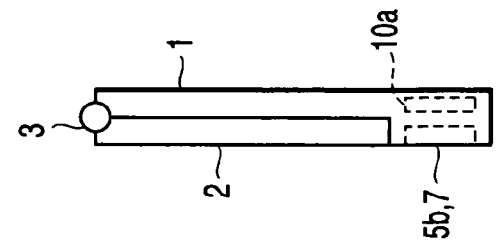

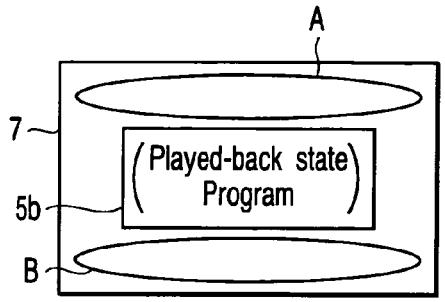
FIG. 3
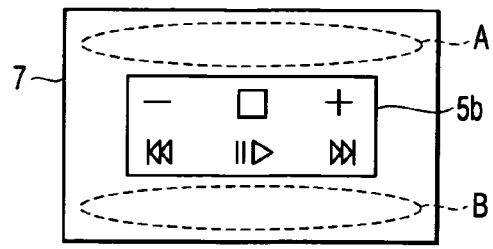
FIG. 4
Area management table
(normal direction)
| A | — |
|---|---|
| B | □ |
| C | + |
| D | ◄◄ |
| E | ❙❙▷ |
| F | ▶▶❙ |
FIG. 5A
Area management table
(reverse direction)
| A | ▶▶❙ |
|---|---|
| B | ❙❙▷ |
| C | ◄◄ |
| D | + |
| E | □ |
| F | — |
FIG. 5C
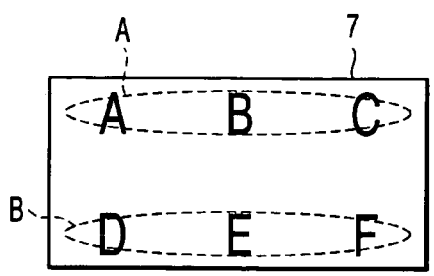
FIG. 5B
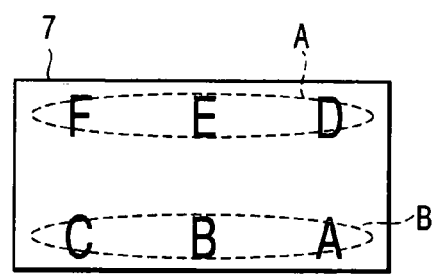
FIG. 5D

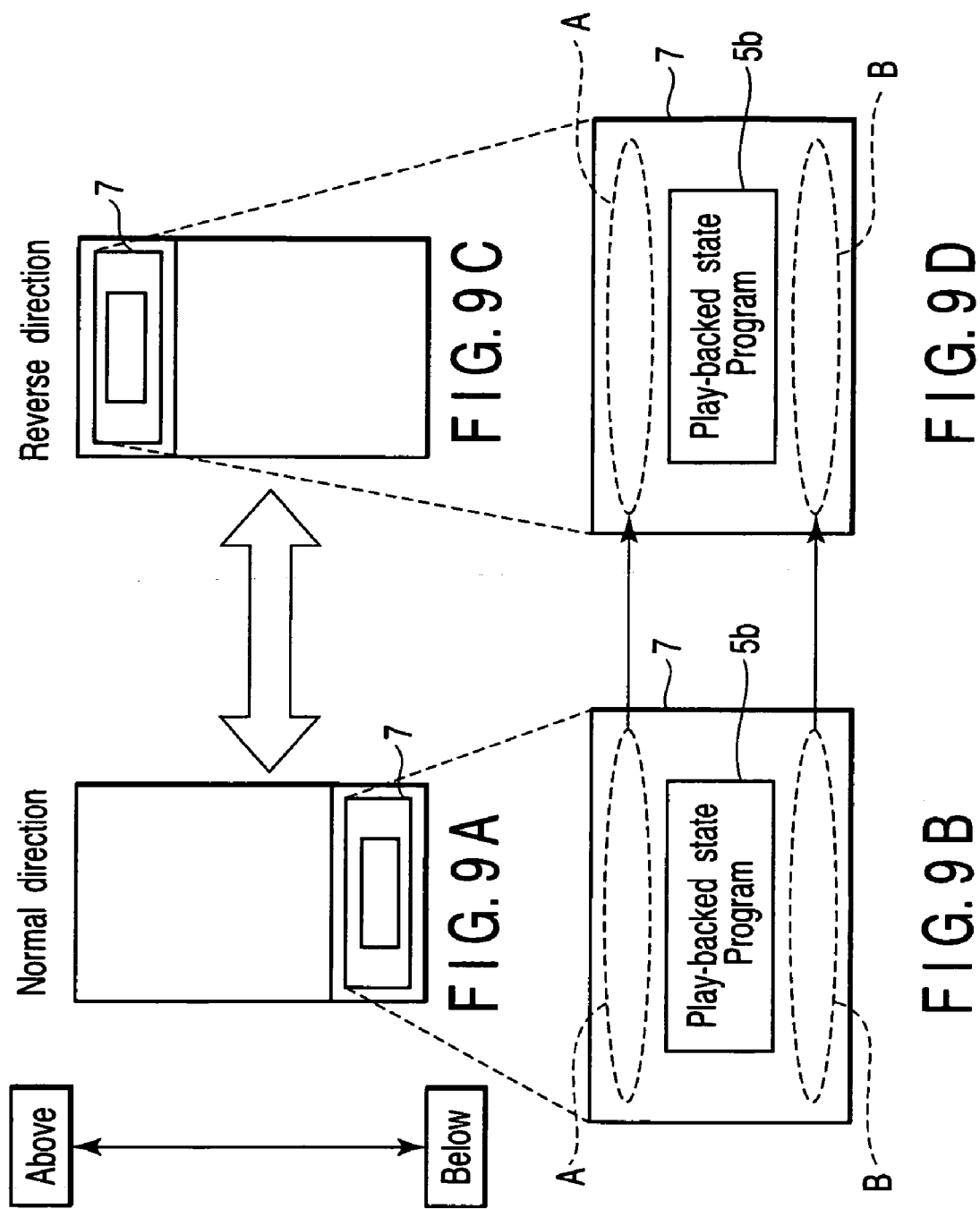

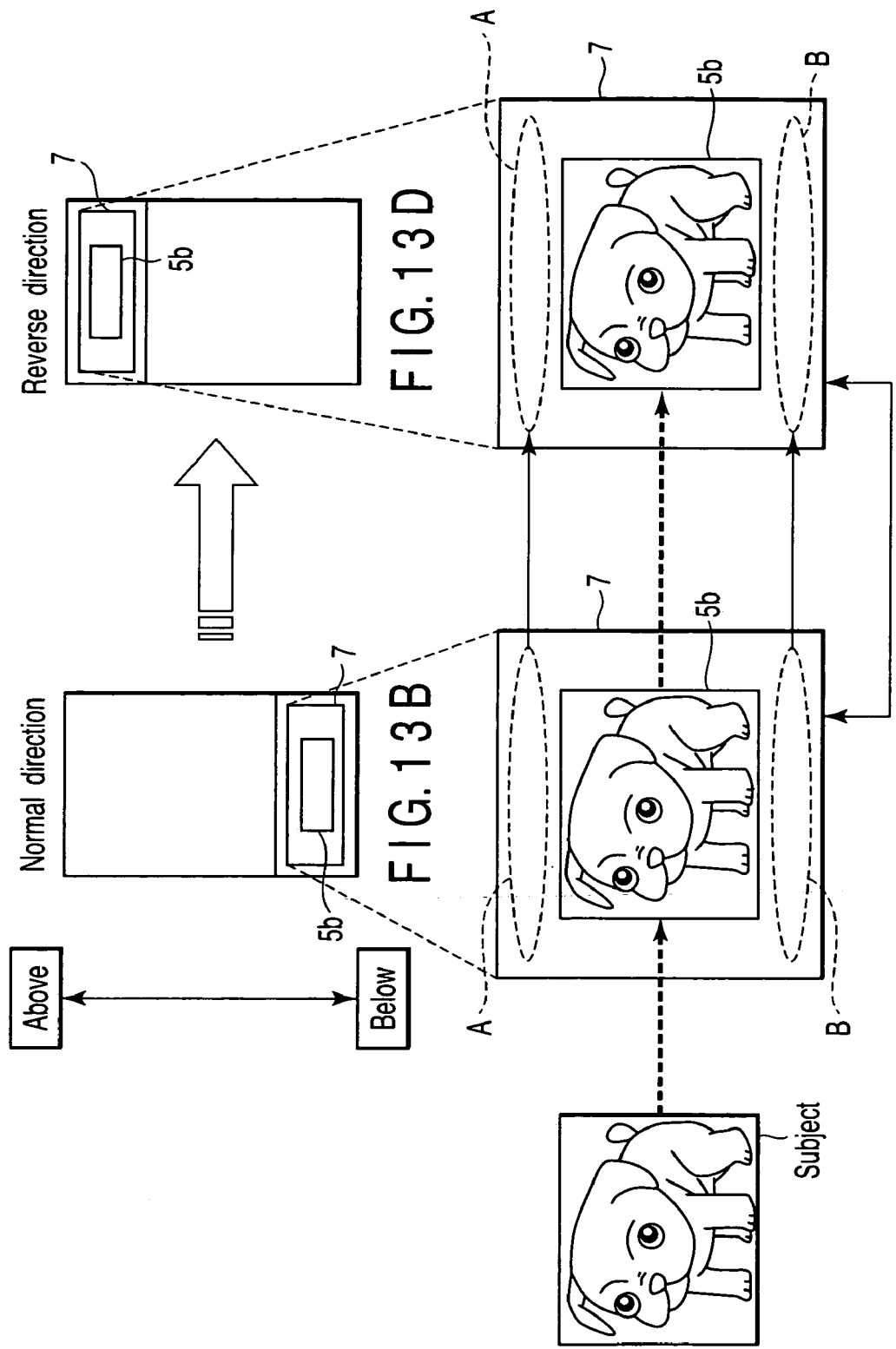

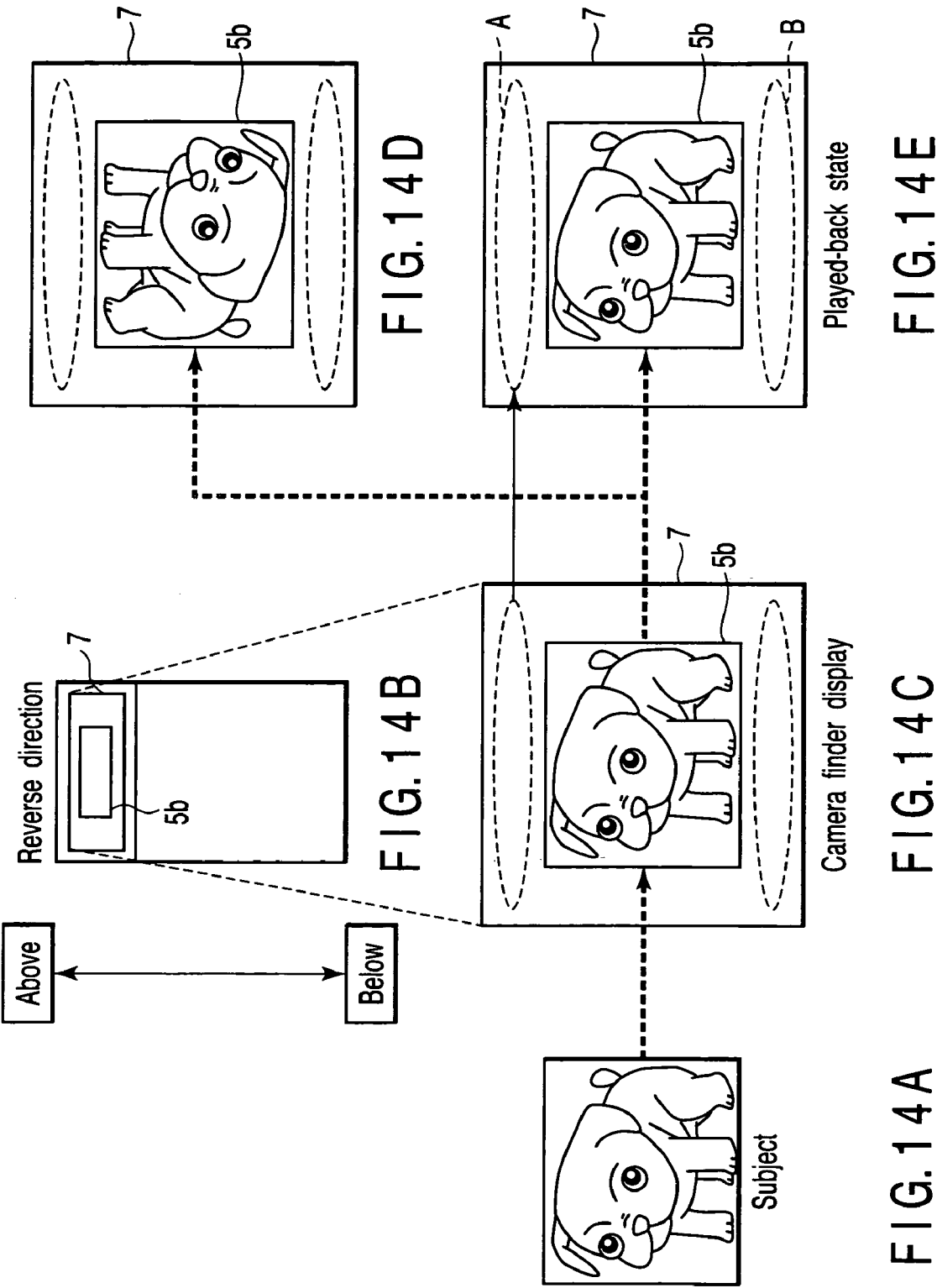

PORTABLE TERMINAL DEVICE

CROSS-REFERENCE TO RELATED APPLICATIONS

This application is based upon and claims the benefit of priority from prior Japanese Patent Application No. 2005-178031, filed Jun. 17, 2005, the entire contents of which are incorporated herein by reference.

BACKGROUND OF THE INVENTION

1. Field of the Invention

The present invention relates to a portable terminal device such as a mobile phone, a personal digital assistant (PDA), etc.

2. Description of the Related Art

Conventionally, a portable terminal device represented by a mobile phone is so constructed as to, when the direction (posture) of the terminal device is changed, allow a corresponding change to be done on an array of keys (for example, Jpn. Pat. Appln. KOKAI Publication No. 2005-12493). In the portable terminal device of this KOKAI Publication, a vertical direction key matrix corresponding to key switches and character information for vertical use and a horizontal direction key matrix corresponding to key switches and character information for horizontal use are arranged. This arrangement is such that, when the horizontal posture is detected by a posture detecting section, the horizontal key matrix is read to ensure the same array as in the case where an array of numeric keys 1 to 9 is used in a vertical direction.

In a portable terminal device equipped with a display device, a structure is also shown, for example, in Jpn. Pat. Appln. KOKAI Publication No. 2000-332866,in which an information array is changed on a display device according to a posture of a terminal device.

In the conventional structure such as the portable terminal device shown in the KOKAI Publication No. 2005-12493, when the posture of the terminal device body is changed, a numeral key array is changed according to its posture and it is possible to obtain the same operability even if the terminal device is used in any direction. In this structure, however, when a posture change is detected by the sensor, the key array is automatically changed and it is so done even in the situation in which the user does not want any change in the key array. As a result, there were sometimes cases that the operability was lowered.

Further, in order not to allow the key array to be automatically changed according to a change in the posture of the terminal device, it is necessary to separately give an instruction as to whether the device should be used in a vertical posture or in a horizontal posture. In this case, each time the key array is changed, it is necessary to give a key array changing instruction to the device. This places added operational burden on the user.

BRIEF SUMMARY OF THE INVENTION

It is accordingly the object of the present invention to provide a portable terminal device which, without placing any added burden on the user, can provide the same operability to an input device as an input operation target even if the terminal device takes any posture direction.

According to an embodiment of the present invention, there is provided a portable terminal device comprising an input device configured to receive an input operation on a plurality of positions, the input device allocating a function to be executed to the plurality of positions by an input operation a sensor configured to detect a posture of the portable terminal device, and a control unit configured to allow the function to be changed according to the posture of the portable terminal device detected by the sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 1A, 1B, 1C, 1D, 1E show an outer appearance of a mobile phone in an embodiment of the present invention;

FIG. 3 is an enlarged view showing a sub-display 5b and touch pad 7 in the present embodiment;

FIG. 4 is a view showing a practical example of information (marks) displaying each function on the sub-display 5b according to the allocated function to the operation area in the present embodiment;

FIGS. 5A, 5B, 5C, 5D are a view showing one practical example of an area management table for managing the functions allocated to the operation areas in the present embodiment;

FIGS. 9A, 9B, 9C, 9D show the states of the touch pad 7 and sub-display 5b when the posture of the mobile phone (first shell 1) in the present embodiment is in a normal and a reverse direction;

FIGS. 13A, 13B, 13C, 13D, 13E are views for explaining the states of the touch panel 7 and sub-display 5b in the case where, at a picture capture mode time, the posture of the mobile phone (first shell 1) is changed from a normal to a reverse direction; and FIGS. 14A, 14B, 14C, 14D, 14E are views for explaining the states of the touch pad 7 and sub-display 5b at the picture capture mode time and playback mode time in the case where the posture of the mobile phone (first shell 1) is in the reverse direction.

DETAILED DESCRIPTION OF THE INVENTION

Figure 2:
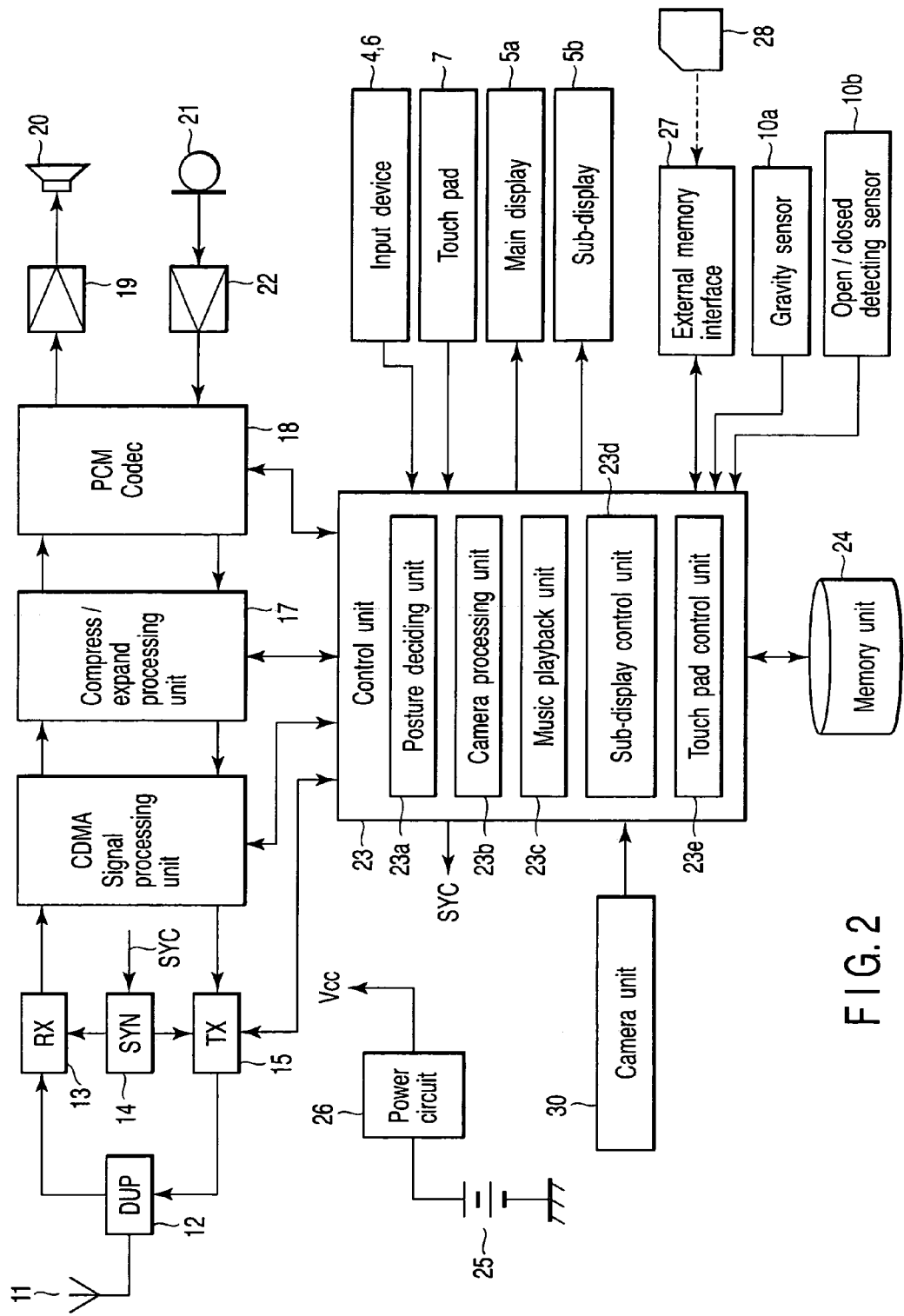
FIG. 2 is a block diagram showing a circuit arrangement of a mobile phone in the present invention.

With reference to the drawing explanation will be given below about an embodiment of the present invention.

FIGS. 1A, 1B, 1C, 1D, 1E show an outer appearance of a mobile phone relating to the embodiment of the present invention. This mobile phone is so-called a folding type portable terminal device comprising an upper casing 1, a lower casing 2 and a hinging section (a coupling mechanism) 3 through which the upper and lower casings are openable and closable relative to each other. It is to be noted that the upper casing 1 and lower casing 2 are referred to as an upper shell 1 and lower shell 2.

On a front surface of the first shell 1 shown in FIG. 1C are provided an input device (function keys 4, dial keys 6), a sub-display 5b, a touch pad 7, and an aperture section 8 for a microphone. The function keys 4 include a plurality of keys to which specific functions are imparted, such as a select key, a transmit key, an end key, a schedule key, a clear key and a cursor key. In the example shown in FIGS. 1B and 1D, the sub-display 5b and touch pad 7 are provided near an end of the first shell 1. The touch pad 7 is comprised of a coordinate input device adapted to input position information on a two-dimensional surface by an input operation. The touch pad 7 is so formed as to surround the sub-display 5b with it. It is to be noted that the sub-display 5b and touch pad 7 may be so formed as to be arranged in an overlaying fashion and, by doing so, it is possible to directly and selectively input information displayed on the sub-display 5b. Incidentally, as shown in FIG. 1C, the sub-display 5b can be formed on a back surface of the second shell 2 and only the touch pad 7 be arranged near an end of a front surface of the first shell 1. A camera unit 30 is provided on the back surface of the first shell 1 as shown in FIG. 1E.

A main display 5a and a hole section 9 for a speaker are provided on the front surface of the second shell 2.

The main display 5a and sub-display 5b are so provided that a backlight is arranged on a rear surface side of a liquid crystal display (LCD). The main display 5a is used to display all display target data such as telephone directory data, camera image data, mail data and pictograph, while, on the other hand, the sub-display 5b is used to display the pictograph and camera image data. As the pictograph there is, for example, information representing a function performed by an input operation on the touch panel 7.

The hinging mechanism 3 provides a function for swingably coupling first and second shells 1 and 2 to each other. The hinging mechanism 3 selectively allows both an input device (function keys 4 and dial keys 6) as a first input device and the touch pad 7 as a second input device at the first shell 1 to be set to an operable open exposed state (a first state) as shown in FIG. 1D and the first shell 1 and second shell 2 to be set to a closed state (a second state) as shown in FIG. 1B with the touch pad 7 alone set to an operable exposed state.

A gravity sensor 10a is provided in the first shell 1. The gravity sensor 10a detects a tilt/direction to a vertical line and outputs a detected signal representing the tilt/direction to a control unit 23 (a posture deciding unit 23a). The posture of the first shell 1 is decided based on the detected signal from the gravity sensor 10a. At the first shell 1 is provided an open/closed state detecting sensor 10b. The sensor 10b detects the states of the first and second shells 1 and 2, that is, the open and closed states, and outputs any open/closed state signal to a control unit 23. The sensor 10b may be comprised of a mechanical sensor adapted to detect the state of, for example, the hinging mechanism 3. Or it may be comprised of a magnetic sensor adapted to detect the proximity of a magnetic substance which is provided in the second shell 2 to a given distance.

An explanation will be made below about the circuit arrangement of the mobile phone above. FIG. 2 is a block diagram showing the circuit arrangement of the mobile phone.

A radio signal which is transmitted from a base station, not shown, is received at an antenna 11 and, after this, is input through an antenna duplexer (DUP) 12 to a receiving circuit (RX) 13. The receiving circuit 13 allows the received radio signal to be mixed with a local oscillator signal which is output from a frequency synthesizer (SYN) 14 to effect a frequency conversion (downconversion) to an intermediate frequency signal. The downconverted intermediate frequency signal is orthogonally modulated to provide a received baseband signal as an output. It is to be noted that the frequency of the local oscillator signal generated by the frequency synthesizer 14 is instructed by a control signal SYC which is output from a control unit 23.

The received baseband signal is input to a code-division multiple access (CDMA) signal processing unit 16. The CDMA signal processing unit 16 has an RAKE receiver. In the RAKE receiver, a multipath information included in the received baseband signal is subjected to diffusion codes to reverse diffusion processing. And the respective path signals thus reverse-diffusion processed have their phases arbitrated to a combined unit. By doing so it is possible to obtain receive packet data of a predetermined transmit format. The receive packet data is input to a compress/expand processing unit (hereinafter referred to as a compander) 17.

The compander 17 allows the receive packet data which is output from the CDMA signal processing unit 16 to be separated by a multiple separation section for each media. Decode processing is applied to the data for each separated media. In a speech mode, for example, the audio data, such as a speech sound in the receive packet data is decoded by a speech codec. Where, as in the TV telephone mode, the video data is included in the receive packet data, the video data is decoded by a video codec.

The digital audio signal obtained by the decoding processing is supplied to a PCM code processing unit (hereinafter referred to as a PCM codec) 18. The PCM codec 18 allows a digital audio signal which is output from the compander to be PCM decoded to output an analog audio signal. The analog audio signal, after being amplified by a receive amplifier 19, is output from a speaker 20 or an earphones, not shown.

Where a music playback function as will be set out below is set, the control unit 23 reads out corresponding audio contents from a memory unit 24 and, after decoding it, outputs it from the speaker (earphones) 20 through the PCM codec 18 and receive amplifier 19.

The digital video signal which is decoded by the compander 17 is input to the control unit 23. The control unit 23 allows the digital video signal which is output from the compander 17 to be stored in a video RAM and an image to be displayed to a main display 5a through the video RAM. It is to be noted that the control unit 23 allows not only the receive video data but also a video data of an image which is captured by a camera unit to be stored in the video RAM and the captured image to be displayed on the main display 5a.

Where a received packet is an e-mail, the compander 17 supplies it to the control unit 23. The control unit 23 saves the e-mail in the memory unit 24. According to a display operation done by the user on the input device 5, the e-mail is read from the memory unit 24 and it is displayed on the main display 5*a*.

It is to be noted that the information representing an operation mode of the device, incoming call information and information showing a residual amount or a recharged level of a battery 25 are displayed on the sub-display 5*b*. The sub-display 5*b* is such that, when the camera unit 30 (camera processing unit 23*b*) as will be stated below is operated, it is used as a finder for displaying an image captured by the camera unit 30.

In the speech mode, on the other hand, a sound signal of a caller which is input to a microphone 21 is amplified by an outgoing call amplifier 22 to a proper level and then PCM coded to a digital audio signal and input to the compander 17. Further, a video signal which is output from a camera, not shown, is digitized by the control unit 23 and then input to the compander 17. It is to be noted that an e-mail prepared in the control unit 23 is input to the compander 17 from the control unit 23.

The compander 17 detects an energy amount of an input speech sound by a digital audio signal which is output from the PCM codec 18 and determines a transmit data rate based on the detected result. And a digital audio signal is coded to a signal of a format corresponding to the transmit data rate and, by doing so, audio data is generated. Further, a digital video signal which is output from the control unit 23 is coded to generate video data. The audio and video data are packetized by a multiplex separation section according to a predetermined transmit format and the transmit packet data is output to the CDMA signal processing unit 16. It is to be noted that, even if the e-mail is output from the control unit 23, it is multiplexed to the transmit packet data.

With the use of a diffusion code allocated to a transmit channel, the CDMA signal processing unit 16 performs spectrum diffusion processing on the transmit packet data output from the compander 17 and delivers its output signal to a transmitting circuit (TX) 15. The transmitting circuit 15 modifies a spectrum diffused signal with the use of a digital modification system such as quadrature phase shift keying (QPSK) system. The transmit signal generated by this modification is combined with a local oscillation signal generated from the frequency synthesizer 14 and frequency-converted to a radio signal. And the radio signal is high frequency amplified so as to reach a transmit power level instructed by the control unit 23. This amplified radio signal is supplied through the DUP 12 to the antenna 11 and transmitted from the antenna 11 to a base station.

The mobile phone of the present embodiment has an external memory interface 27. This external memory interface 27 is equipped with a slot via which a memory card 28 is removably inserted. Under the control of the control unit 23, the external memory interface 27 reads, for example, video (image) content data, audio content data, etc., from the memory card 28 inserted in the slot. The control unit 23 decodes/reproduces the read video content data to allow it to be displayed on the main display 5*a* and decodes/reproduces the audio content to allow it to be output from the speaker (earphones) 20.

It is to be noted that a power source circuit 26 generates a predetermined operation power supply voltage Vcc based on the output of the battery 25 and supplies it to each circuit parts. The battery 25 is recharged by a charging circuit not shown. The memory unit 24 uses, for example, an EEPROM or a hard disk as a memory medium.

A mobile phone of the present invention includes a camera unit 30. In a picture capture mode, the camera unit 30 performs an image capture according to an input operation to a position with a shutter function allocated to, for example, to the touch pad 7 in the case where the first and second shells 1 and 2 are used in a closed state and according to the input operation to the select key in the case where these shells are used in an open state. The image data captured by the camera unit 30 is output to the control unit 23 (camera processing unit 23*b*) and recorded in the memory card 28 or memory unit 24.

Incidentally, the control unit 23 includes, for example, a microcomputer (central processing unit [CPU]) and has, as the control functions of the present invention, a posture deciding unit 23*a*, a camera processing unit 23*b*, a music playback unit 23*c*, a sub-display control unit 23*d* and a touch pad control unit 23*e*. These functions are realized all by running a program on the microcomputer.

The posture deciding unit 23*a* decides a posture of the first shell 1 based on the detected signal output from the gravity sensor 10*a*. For ease in explanation, according to the present embodiment, an explanation will be made below about detecting two posture directions, that is, a normal direction with the touch pad 7 on the lower side as shown in FIG. 1B and a reverse direction with the touch pad on an upper side.

The camera processing unit 23*b* controls the camera unit 30 to realize a camera function and controls an image pick-up operation according to an input operation on the input device (function keys 4, dial keys 6) or on the touch pad 7. The camera processing unit 23*b* allows the image data of an image picked up by the camera unit 30 to be stored into the memory card 28 via the memory unit 24 or the external memory interface 27. It is to be noted that the camera processing unit 23*b* allows a still image to be picked up by the camera unit 30 and a moving image to be captured by the camera unit.

The music playback unit 23*c* realizes a music playback function and allows the audio content which are stored, for example, in the memory unit 24 or the memory card 28 to be read according to the input operation on the input device (function keys 4, dial keys 6) or the touch pad 7 and then decoded and output from the speaker (earphones) 20 through the PC codec 18 and receive amplifier 19.

The sub-display control unit 23*d* is adapted to display-control the sub-display 5*b* and displays various kinds of information according to the function now being performed. The sub-display control unit 23*d* displays, for example, the information and pictograph such as a radio wave situation, a residual amount of a battery, etc., representing allocated functions to a plurality of positions where an input operation on the touch pad 7 is done under the touch pad control unit 23*e*. According to a change in the allocated functions to the input operation position, a corresponding change is also made in the information display position representing the allocated functions to the respective positions.

The touch pad control unit 23*e* is adapted to control an input from the touch pad 7. It detects an input operation by which a coordinate position information corresponding to a position on the input surface of the touch pad 7 is input by pressing a user's finger tip, a stylus, etc., against a corresponding position there. According to a performing function, the touch pad control unit 23*e* allocates a corresponding function to a plurality of positions where an input operation is done. Where a closed state of the first and second shells 1 and 2 is detected by the open/closed state signal from the open/closed detecting sensor 10*b*, the touch pad control unit 23*e* changes the allocated function's positions on the touch pad 7 according to the posture of the first shell 1 which is detected by the posture deciding unit 23*a*. That is, even if the first shell 1 is in any of a normal and a reverse direction state, the same operability is secured by allocating the same function to a relative position on the touch pad 7.

Further, where a change in the posture of the first shell 1 is detected by the posture deciding unit 23a, the touch pad control unit 23e achieves a function change after an elapse of a predetermined time so that a given operation is not affected due to any temporary posture change. Further, the touch pad control unit 23e decides whether or not any input operation is done on the touch pad 7 and, even if the posture of the first shell 1 changes during a time period in which the input operation is decided as being done, any change in the allocated function to the position on the touch pad 7 is stopped. And at a time point in which the input operation is finished, any function change is executed under the control.

An explanation will now be made below about an area where an input operation is done on the touch pad 7. FIG. 3 is an enlarged view showing the sub-display 5b and touch pad 7. In FIG. 3 (FIGS. 1B, 1D), the sub-display 5b is located near the touch pad 7 and, for example, the touch pad 7 is provided around a peripheral portion of the sub-display 5b.

For example, in the case of performing a music playback function, a played-back state of the audio contents, any program of the audio content during playback, etc., are displayed on the sub-display 5b.Further, where any music playback function is performed, a music playback operation control function is allocated to each of a plurality of positions on the touch panel 7.

In a practical example shown in FIG. 3, at an operation area (A) provided at the upper portion of the touch pad 7, a volume down adjusting function, a volume up adjusting function and a playback stop function are allocated on the left side, on the right side and at the middle position, respectively. In an operation area (B) provided at the lower portion of the touch panel 7, a wind-back function, a fast forward-function and a playback/pause function are allocated on the left side, on the right side and at the middle portion, respectively.

By the input operation (pressing) to (against) the function allocating position (area), the user can instruct the execution of the function corresponding to the position.

It is to be noted that the operation area (A) is an area positioned at the upper portion of the touch pad 7 even where the posture of the first shell 1 is in the normal direction or in the reverse direction and, likewise, the operation area (B) is an area positioned at the lower portion.

FIG. 4 shows a practical example displaying respective function representing information (marks) according to the allotted functions to the operation areas. As shown in FIG. 4, the function representing information displayed on the sub-display 5b are relatively the same as those at a function array allocated to the operation area (A) and operation area (B). By referring to the information displayed on the sub-display 5b it is possible to easily identify which function is allocated to the respective position of the touch pad 7.

It is to be noted that, by making the size of the input area on the touch pad 7 substantially the same as that of the display area on the sub-display 5b and allowing both to be set in an overlaying way, it is possible to display the information (marks) representing the function the same as that on the function allocated position on the touch pad 7. In this case, by performing an input operation directly designating a mark on the sub-display 5b it is possible to instruct the execution of the function corresponding to that mark. Where a change is made in the position of the function allocated on the touch pad 7, the display position changes according to that change.

Although two practical examples shown in FIGS. 3 and 4 are shown in connection with the sub-display 5b, the present invention is not restricted to them. For example, the sub-display 5b displays not only the playback state and music program as shown in FIG. 3 but also the information (marks) representing respective functions allocated to the operation area as shown in FIG. 4. Further, the display of FIG. 3 and that of FIG. 4 may be alternately made for each given time period.

FIGS. 5A and 5C each show an area management table for managing those functions allocated to the operation area. The control unit 23 (touch pad control unit 23e) manages the function allocated to each position (area) on the touch pad 7 by recording the function on the area management table in a way to correspond to each area. In the examples shown in FIGS. 5A and 5C, respective areas are represented by A to F.

FIG. 5B shows the case where the posture of the first shell 1 is in a normal direction. To the areas A to F, corresponding functions are allocated as in the area management table shown in FIG. 5A. FIG. 5D shows the case where the posture of the first shell 1 is in a reverse direction and, to the areas A to F, corresponding functions are allocated as in the area management table shown in FIG. 5C. As shown in FIG. 5D, by making the posture of the first shell 1 in the reverse direction, those areas F, E, D are located to the operation area (A) and, to the operation area (B), areas C, B, A are located. In order to provide the same operability to any of the normal and reverse directions, the function (for example, a volume down adjusting function [−]) allocated to the area 5A in a normal direction time is allocated to the area F in the reverse direction time as shown in FIG. 5C.

It is to be noted that the areas A to F are set in a range in a rectangular form defined by two points, for example, on the touch pad 7.

Figure 6:
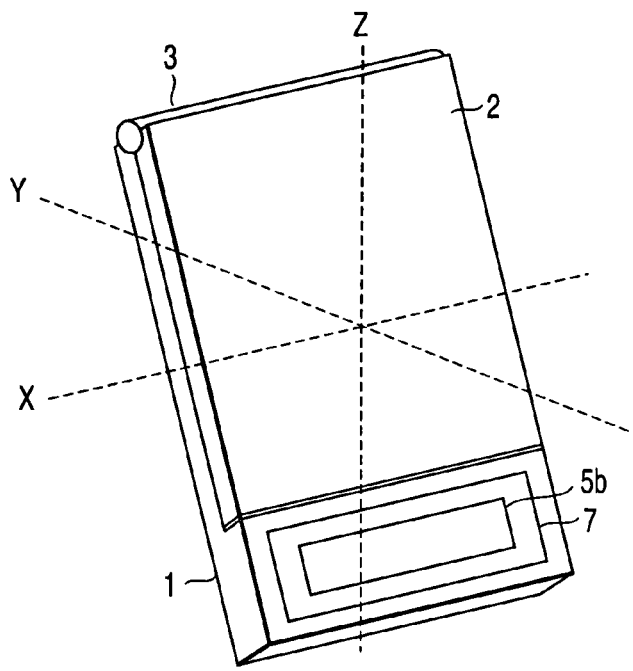
FIG. 6 is a view showing the direction of a posture detectable with the use of a gravity sensor 10a in the present embodiment.

FIG. 6 is a view showing the directions of a posture detected by the gravity sensor 10a in the mobile phone in the present embodiment.

The gravity sensor 10a detects the tilt/direction relative to a z-axis direction (vertical line) in FIG. 6 and outputs a detected signal to the control unit 23 (posture deciding unit 23a). The posture deciding unit 23a decides any change of, for example, a tilt relative to the z-axis exceeding a given pre-set standard angle of 90° (that is, a horizontal direction) by the use of the detected signal from the gravity sensor 10a and, by doing so, decides whether the posture of the first shell 1 is in the normal direction or in the reverse direction. It is to be noted that the standard angle for use in the posture decision by the posture deciding unit 23a may be other than 90°. Further, the standard angle on which a change from a normal to a reverse direction is decided may be different from the standard angle on which a change from the reverse to the normal direction is decided.

An explanation will now be made below about the operation of the mobile phone of the present embodiment.

Figure 7:
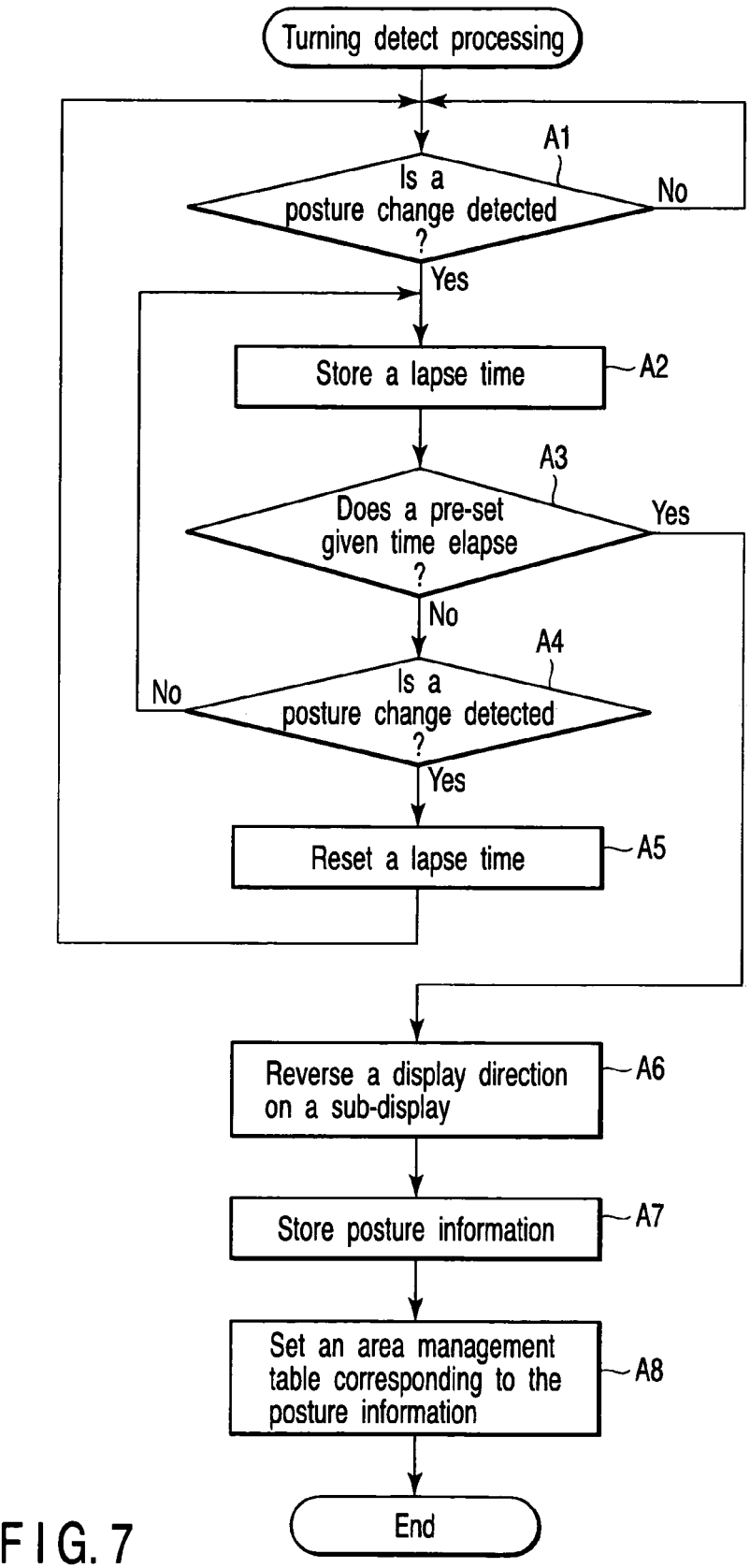
FIG. 7 is a flowchart for explaining posture detect processing by a control unit 23 in the present embodiment.

FIG. 7 is a flowchart for explaining a posture detection by the control unit 23.

Suppose that, irrespective of the states of the first and second shells 1 and 2, that is, irrespective of the open and closed states of these shells, an input operation can be done by the user on the touch pad 7 and information can be displayed on the sub-display. Here, an explanation will be made below about the example of executing a music playback function by the music playback unit 23c (music reproduction application). The music playback unit 23c can be operated irrespective of the shell open/closed state.

When the execution of the music playback function is instructed by the operation on the function key 4 or a button, not shown, on the touch pad 7, the audio content is read out from the memory unit 24. The music playback unit 23c performs decode processing on the audio content and, through the PCM codec 18 and receive amplifier 19, a corresponding output is delivered from the speaker 20 or the earphones (not shown).

Normally when the music playback function alone is used, the mobile phone is used with the first and second shells 1 and 2 in the closed (overlaid) state. The music playback unit 23c allows the sub-display control unit 23d to display a played-back state, program, etc., on the sub-display 5b under the execution of the music playback function.

Further, where the music playback function is performed, the music playback unit 23c allows the function to be allocated to the respective positions on the touch pad 7 under the control of the touch pad control unit 23e so as to receive an input operation for controlling the music playback operation via the touch pad 7. For example, where the posture of the mobile phone (first shell 1) is in the normal direction, the area management table as shown in FIG. 5A is set and various functions, such as playback/pause/fast forward/wind-back/volume control, etc., are allocated to the respective areas A . . . F on the touch pad 7.

Here, the user, while carrying the mobile phone in any posture direction, can perform any input operation.

When the posture deciding unit 23a detects a change in the posture direction of the first shell 1 from a detected signal from the gravity sensor 10a-step A1, an elapse time is counted from this time point and it is stored-step A2.

Here, if, without elapsing any given pre-set time, a change in the posture of the first shell 1 is again detected (steps A3, A4), the elapsed time counted up to this time is reset-step A5.

That is, even if a change occurs in the posture direction of the mobile phone, it is a momentary change and, if the mobile phone is used in an original posture direction state, it is decided that a change in the allocated function to the associated positions on the touch pad and a change in the display direction of the sub-display 5b are not necessary.

It is to be noted that the given pre-set time is a proper time, for example, about 1 second, which is continued in that state after a change has occurred in the posture direction. This pre-set time may be properly changed from the instruction from the user.

If it is decided that the pre-set time is elapsed from the detection of a posture change, the posture deciding unit 23a allows a change in the display direction to be done on the sub-display 5b under the sub-display control unit 23d. In the present embodiment, the posture of the mobile phone (first shell 1) is detected in two directions, normal and reverse, and the display image surface is turned in the reversed direction-step A6.

Further, the posture deciding unit 23a stores the posture information representing any direction, normal or reverse, of the posture of the first shell 1-step A7.

The touch pad control unit 23e sets an area management table corresponding to the posture information stored under the posture deciding unit 23a and allocates a function corresponding to the posture direction to the associated positions on the touch pad 7-step A8.

Figure 8:
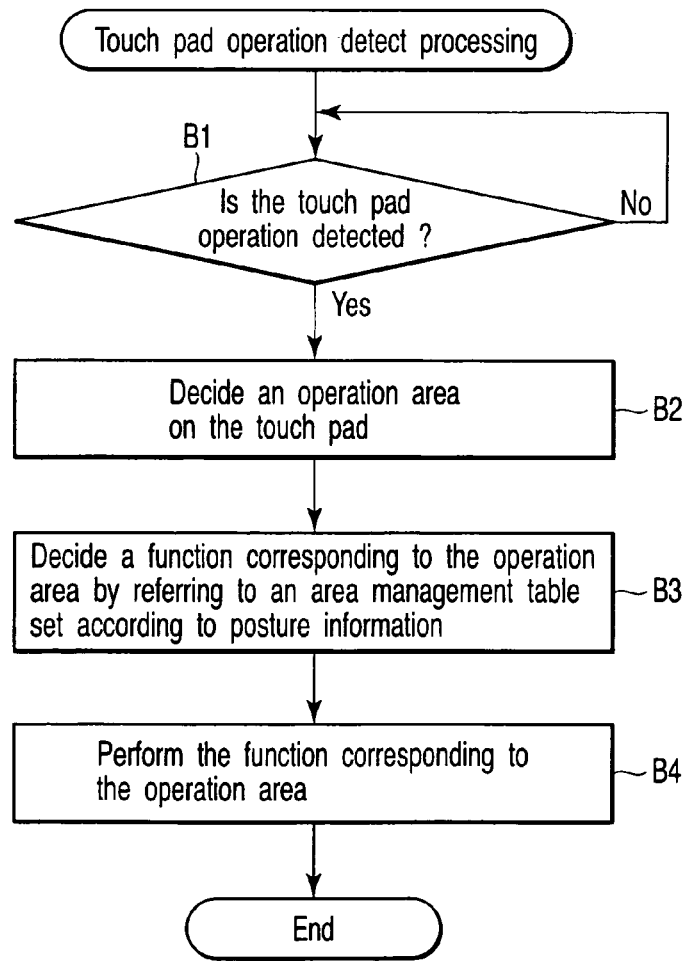
FIG. 8 is a flowchart for explaining touch pad operation detect processing for detecting an input operation on the touch pad 7 in the present embodiment.

Referring to a flowchart shown in FIG. 8, an explanation will be made below about the touch pad operation detection processing for detecting an input operation on the touch pad 7.

Various kinds of functions corresponding to the posture directions detected under the posture detect processing are allocated to the associated positions on the touch pad 7. Here, when the user presses his or her finger tip, stylus, etc., against the input surface of the touch pad 7, the coordinate information corresponding to the pressed position is input.

The touch pad control unit 23e detects an input operation as being done based on the coordinate information input from the touch pad 7-step B1. It is decided if the input coordinate information is included in any function allocated area on the touch pad 7-step B2.

If the touch pad control unit 23e decides that the input operation is done onto any area (position), the allocated function to the corresponding area is decided by referring to the area management table set according to the posture information-step B3.

Where, for example, the posture of the mobile phone (first shell 1) is in the normal direction, if an input operation is done to the left top area (area A) on the touch pad 7, it is decided that a down volume function is allocated to the area A as shown in FIGS. 5A and 5B. Similarly, if an input operation is done to the right top area (area C) on the touch pad 7, it is decided that an up volume function is allocated to the area C.

The music playback unit 23c performs a function designated by an input operation which is decided by the touch pad control unit 23e-step B4.

FIGS. 9A, 9B, 9C, 9D show the states of the touch pad 7 and sub-display 5b when the posture of the mobile phone (first shell 1) is in the normal direction and in the reverse direction. The allocated functions of the operation areas (A) and (B) when the posture is in the normal direction as shown in FIG. 9A performs the same as that of the operation area (A) and operation area (B) even when the posture is changed in the reverse direction as shown in FIG. 9C.

When, in this way, a pre-set given time is elapsed from after a change occurs in the posture direction of the mobile phone, the mobile phone is regarded as being used in the changed posture direction. By, in this way, changing the allocated function positions on the touch pad 7 in the same direction, normal or inverted, it is possible to, irrespective of any posture directions, provide the same operability to the touch pad 7.

If, as explained above, a change occurs in the posture direction of the first shell and a pre-set given time is elapsed after this, then the allocated functions to the respective areas on the touch pad and the display direction on the sub-display 5b are changed. In the example below, another case will be explained below in which these changes are not involved in interlock with the change in the posture direction. This case will be explained below with reference to a flowchart shown in FIG. 10.

If a posture direction of the first shell 1 is detected by the posture deciding unit 23a as being changed based on a detected signal from the gravity sensor 10a (step C1), the control unit 23 decides whether or not the first shell 1 and second shell 2 are set in an overlaid closed state based on an open/closed state signal from the open/closed detecting sensor 10b-step C2. Here, if the first shell 1 and second shell 2 are in a closed state (No at step C2), that is, if the function keys 4 and dial keys 6 on the front surface of the first shell 1 are exposed and an input operation ready state is set on these keys, it is decided that the user wants an input operation on these keys. In this case, the touch pad control unit 23e perform no function allocation change to the respective positions on the touch pad 7.

If, on the other hand, a change in the posture direction is detected and the first shell 1 and second shell 2 are in a closed state (Yes at step C2), then the touch pad control unit 23e detects an input operation as being done on the touch pad 7 based on the lack/no lack of any coordinate information from the touch pad 7-step C3. That is, it is decided whether or not the posture direction of the mobile phone is in a changed state while performing an input operation on the touch pad 7 of the mobile phone.

Here, if no input operation is done on the touch pad 7 (No at step C3), the control unit 23 allows the sub-display control unit 23d to change a display direction on the sub-display 5b. In the present embodiment, two directions, normal and reverse, are detected as a posture direction of the mobile phone (first shell 1) and the display image surface is turned in the reversed direction (step C8).

Further, the posture deciding unit 23a stores any posture information showing the posture direction of the first shell 1 as being a normal direction or a reverse direction (step C9).

The touch pad control unit 23e sets an area management table corresponding to the posture information stored in the posture deciding unit 23a and allocates the function to the associated positions on the touch pad 7 according to the posture direction-step C10.

If, on the other hand, at a time of detecting a change in the posture direction, any input operation is done on the touch pad 7 (Yes at step C3), the touch pad control unit 23e decides that the coordinate information which is input from the touch pad 7 is included in any function allocated area on the touch pad 7-step C4.

The touch pad control unit 23e, if being decided that the input operation is done on any area (position), decides any allocated function to the associated area by referring to the area management table set according to associated posture information (step C5). In this connection it is to be noted that the area management table thus referred to is an area management table set before the posture direction is changed.

The music playback unit 23C performs a function instructed by an input operation which is decided by the touch pad control unit 23e-step C6. Where an input operation is continued on the touch pad 7, for example, the position (area) corresponding to the allocated function continues depressed so as to raise or lower volume, the music playback unit 23c performs processing corresponding to the depressed position function-steps C3 to C7.

When the touch pad control unit 23e detects that the input operation is finished on the touch pad 7 (No at step C3), the control unit 23 allows the sub-display control unit 23d to change a display direction on the sub-display 5b.

The posture deciding unit 23a stores any posture information showing whether the posture of the first shell 1 is in the normal direction or in the reverse directions-step C9.

The touch pad control unit 23e sets an area management table corresponding to the posture information stored in the posture deciding unit 23a and allocates the functions corresponding to the posture direction on the associated positions of the touch pad 7-step C10.

FIGS. 11A, 11B, 11C, 11D, 11E, 11F show the states of the touch pad 7 and sub-display in the case where the posture of the mobile phone (first shell 1) is changed from a normal to a reverse direction.

Figure 11:
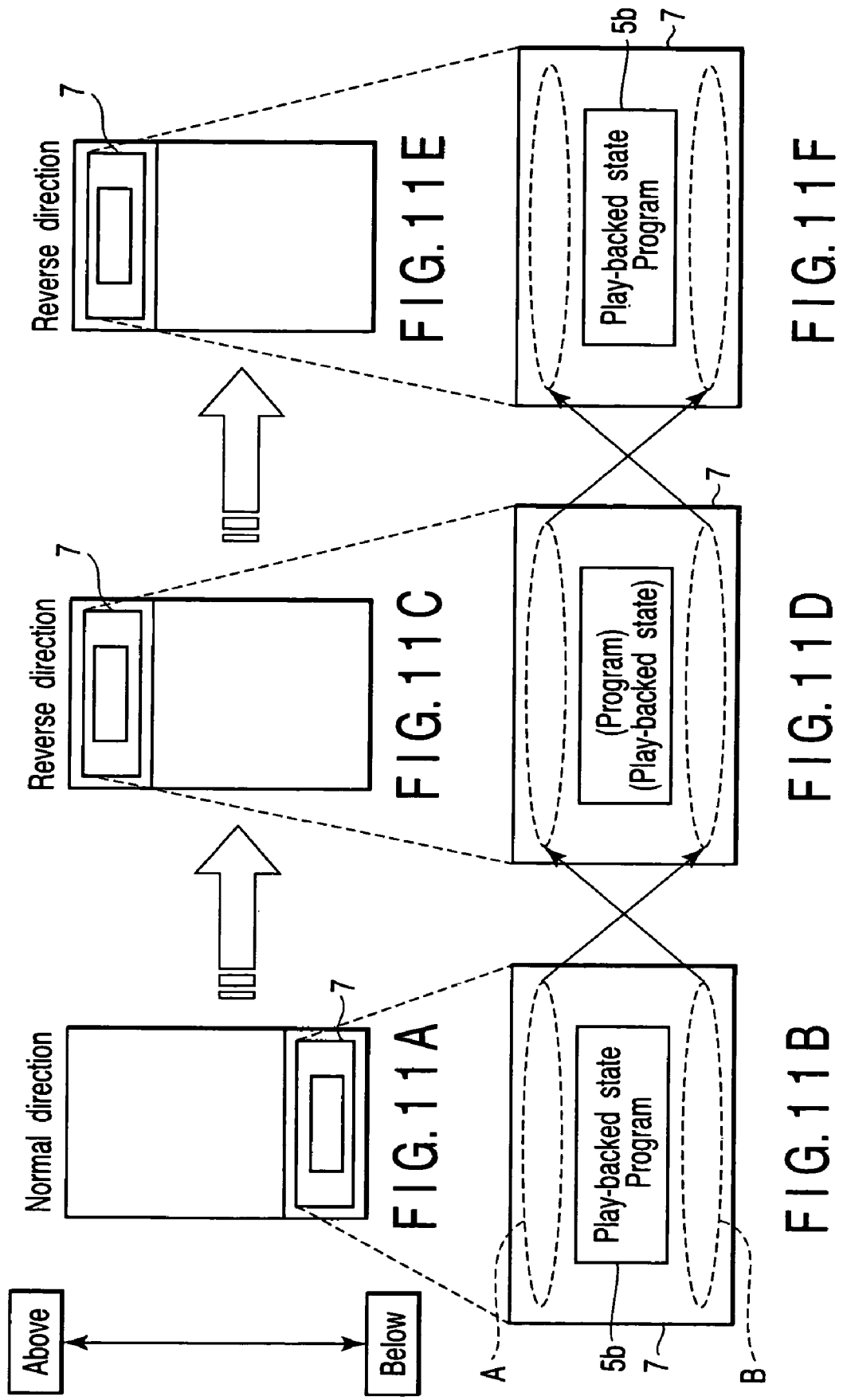
FIGS. 11A, 11B, 11C, 11D, 11E, 11F are views showing the states of the touch pad 7 and sub-display 5b in the case where the posture of the mobile phone (first shell 1) in the present embodiment is changed from a normal to a reverse direction.

FIG. 11A shows an input operation done on the operation area (A) when the posture of the mobile phone is in a normal direction. Here, if, as shown in FIG. 11C, the mobile phone is turned at the input operation and, by doing so, the posture direction is changed, the allocated function to the operation areas (A) and (B) remains unchanged. When the input operation is finished on the touch pad 7, the allocated functions to the operation areas (A), (B) are changed as shown in FIG. 11F and it is possible to obtain the same operability as shown in FIG. 11F.

As explained in the flowchart shown in FIG. 7, after an elapse of a pre-set given time following a detection of a change in the posture direction of the first shell 1 it may be decided whether or not any input operation is now done.

Although, as being set out above, in the case of varying the posture direction of the first shell 1, the display direction of the sub-display 5b is changed in the same timing as the changing of the allocated functions to the positions on the touch pad 7, the changing of the display direction on the sub-display 5b may be done even if an input operation is being done. That is, although, in FIG. 11D, the allocated functions to the operation areas (A), (B) are not changed, it is possible to obtain a display image surface as shown in FIG. 11B by turning the display 5b in a reverse direction, so that the "playback state" and "music program" are displayed at an upper line and a lower line, respectively.

Where the first shell 1 and second shell 2 are in the open state, it is decided that the input operation is not done on the touch pad 7 and, even if a change occurs in the posture direction of the first shell 1, the allocated functions to the associated positions on the touch pad 7 are not changed. Further, even if the posture direction of the first shell 1 is changed during the input operation, it follows that, in order to allow the input operation to be continued on, the allocated functions to the associated positions on the touch pad 7 are not changed and they are changed at a time point when the input operation is finished. Where an input operation is made on the touch pad 7 without designating an input operation to any of the touch pad 7 and input device (function keys, dial keys 6), it is possible to provided the same operability even if the first shell 1 takes any posture direction.

Now an explanation will be made below about the camera unit 30 on the first shell 1.

Figure 12:
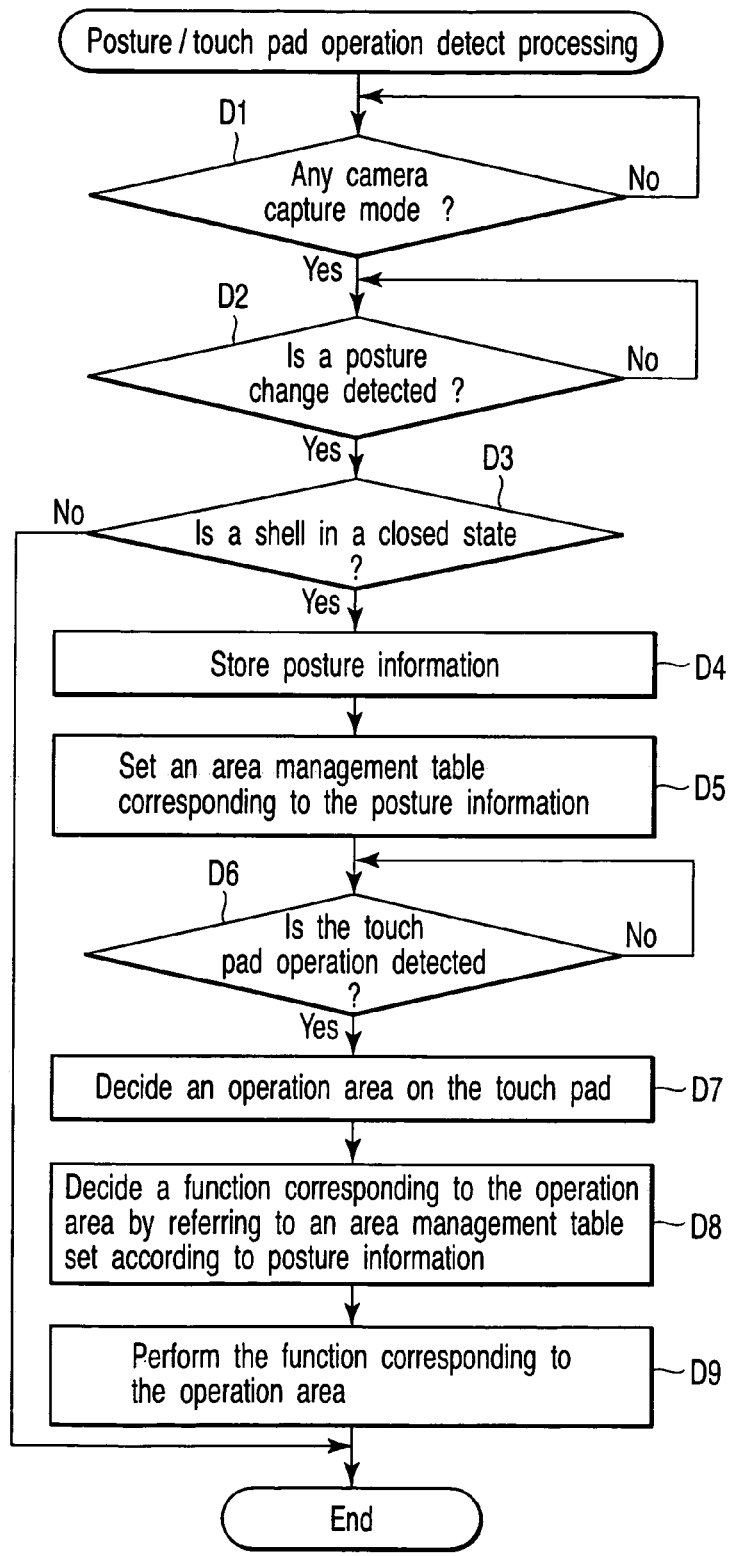
FIG. 12 is a flowchart for explaining a posture/touch pad operation detect processing in the case of using a camera unit 30 in the present embodiment.

FIG. 12 shows a flowchart for explaining a posture/touch pad operation detect processing using a camera unit 30.

First, when the execution of the camera function is designated by an input device (function keys 4, dial keys 6) or an input operation on the touch pad 7, the camera unit 30 is started to allow it to be shifted to a picture-taking mode (Yes at step D1).

Where, in the picture-taking mode, the first shell 1 and second shell 2 are detected as being in an overlaid closed state by a signal from the open/closed detection sensor 10b, the touch pad control unit 23e allocates various functions to control a picture taking operation on the input positions of the touch pad 7, that is, a plurality of functions, such as a zooming-out, zooming-in, shutter operation, etc., on a plurality of position on the touch pad 7.

In the picture-taking mode, the camera unit 30 receives an image of a subject as an input and delivers a corresponding image as image data to the control unit 23. Based on the image data of the camera unit 30, the camera processing unit 23b allows an image to be displayed like a camera finder. In a closed state, the camera processing unit 23b allows the image to be displayed with the sub-display 5b as a camera finder. In the open state, on the other hand, the main display 5a displays an image like a camera finder.

The camera processing unit 23b allows an image to be captured on the camera unit 30 through the input operation corresponding to the select key in the open state and through the input operation, in a closed state, with a shutter function allocated to the touch pad 7. The camera processing unit 23b allows an image which is captured by the camera unit 30 to be received as image data and allows the image data to be stored in the memory card 28 or memory unit 24.

In the picture taking mode time, when a change in the posture of the first shell 1 is detected by the posture deciding unit 23a (Yes at step D2), the control unit 23 decides whether or not the closed state is involved and does so based on an open/closed state signal from the open/closed detecting sensor 10b-step D3.

Here, if it is decided as not involving any closed state (No at step D3), the control unit 23 allows the main display 5a to be used as a camera finder and the input device (function keys 4, dial keys 6) to be used for controlling the picture taking operation, so that any change of the function allocation is not made on the touch pad 7.

If, on the other hand, it is decided that a closed state is involved (Yes at step), the posture deciding unit 23a allows the storing of the posture information showing that the posture direction of the first shell 1 is in any of the normal direction and reverse direction (step D4).

The touch pad control unit 23e sets an area management table corresponding to the posture information stored in the posture deciding unit 23a and allocates the function corresponding to the posture direction on the associated positions of the touch pad 7-step D5.

Where, for example, the posture is in the normal direction an zooming out, zooming-in and shutter functions are allocated to the left side, the right side and the middle portion, respectively, of the touch pad 7, if the posture is in the reverse direction, zooming-out, zooming-in and shutter functions are also allocated to the left side, the right side and the middle portion, respectively, of the touch pad.

Here, if any input operation is made on the touch pad 7 (Yes at step D6), the touch pad control unit 23e decides whether the coordinate information input from the touch pad 7 is included in any allocated function area on the touch pad 7-step D7.

If the touch pad control unit 23e decides whether an input operation is done on any area (position), the allocated function to the associated area is decided by referring to the area management table set according to the posture information-step D8.

The camera processing unit 23b performs a function designated by the input operation which is decided by the touch pad control unit 23e-step D9.

FIGS. 13A, 13B, 13C, 13D, 13E are views for explaining the states of the touch pad 7 and sub-display 5b in the case where, in the picture taking mode time, the posture of the mobile phone (first shell 1) is turned from the normal to the reverse direction.

As shown in FIGS. 13C, 14E, when the posture of the mobile phone is in any of the normal and reverse directions, an image of a subject as shown in FIG. 13A is displayed as it is with the sub-display 5b as a camera finder. Where, as shown in FIG. 13C, the posture is in the normal direction, even if the posture is turned to the reverse direction, the same functions are allocated to the operation areas (A) and (B).

Figure 10:
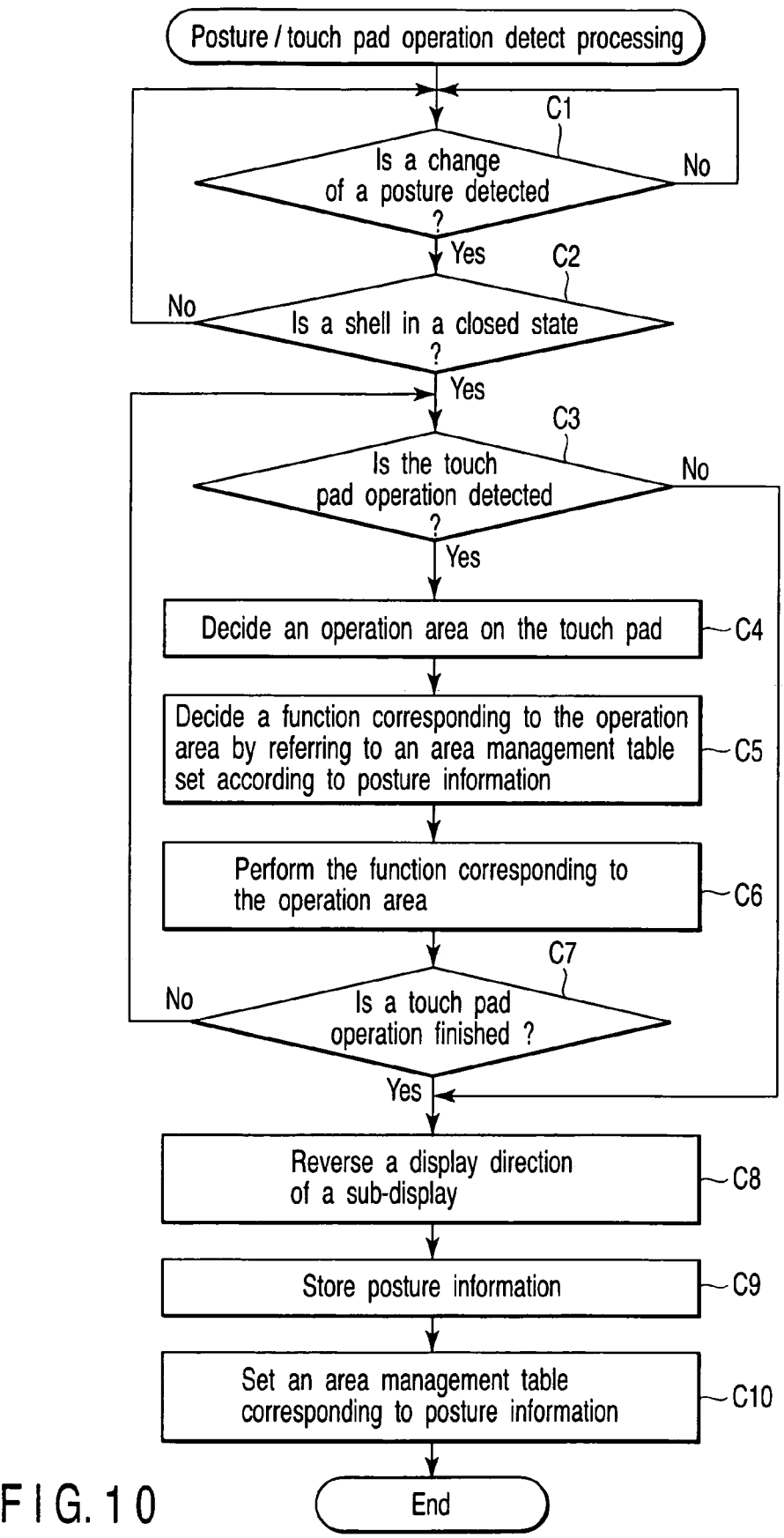
FIG. 10 is a flowchart for explaining the case where an allocated function to respective areas of the touch pad 7 and display direction of the sub-display 5b are not changed in connection with a change of a posture direction in the present embodiment.

It is to be noted that, where even in the case of performing the camera function the posture direction of the first shell 1 is changed during the input operation on the touch pad 7, any allocated function to the associated positions on the touch pad 7 is not changed and, as explained in connection with the flowchart shown in FIG. 10, it may be changed at the time point in which the input operation is finished.

In this way, even if the posture direction is changed, the displayed direction is not changed on the sub-display 5b and only the allocated function's positions can be changed on the touch pad 7.

Although, in FIGS. 13C, 13E, the states of the touch pad 7 and sub-display 5b at the picture taking mode time are shown, if, at a reproduction image mode time when a captured image is displayed, an image is captured with its posture direction reversed, its display direction is changed and the allocated function positions are not changed on the touch pad.

If the posture is in the reverse direction, the camera processing unit 23b allows the captured image to be stored in the memory card 28 or the memory unit 24 and allows the posture information which shows the posture detected by the posture deciding unit 23a in connection with the recorded image to be stored in the memory card 28 or the memory unit 24.

FIGS. 14A, 14B, 14C, 14D, 14E are views for explaining the states of the touch pads 7 and sub-display 5b at the picture taking mode time and reproduction mode time in the case where the posture of the mobile phone (first shell 1) is in the reverse direction.

Where, as shown in FIG. 14B, the posture is in the reverse direction, the image of a subject shown in FIG. 14A is displayed as it is on the sub-display 5b serving as a camera finder. When the captured image is reproduced and displayed, the camera processing unit 23b reads out the image data stored in the memory card 28 or the memory unit 24. At this time, the posture information is also read out in connection with the read-out image data.

Where the posture information is shown as being the image data of an image captured in the reverse direction, the camera processing unit 23b performs up/down reversing conversion processing on the image data and the sub-display control unit 23d displays the converted image data on the sub-display 5b.

Where, for example, an image captured with a posture in a reverse direction as shown in FIG. 14B is directly displayed in a reverse direction state on the display 5b, a corresponding image is displayed with an original direction of the subject in a reversed state as shown in FIG. 14D. By displaying it in a reverse direction it is possible to display an image in the same direction as seen like that of a "camera finder".

Where, in this way, no posture direction is changed, the display direction on the sub-display 5b is changed and, by doing so, no allocated function can be changed on the touch pad 7.

Although, in the above-mentioned explanation, a mobile phone (portable terminal device) is so constructed by way of example as to provide a foldable type device with the first shell 1 (first casing) and second shell 2 (second casing) connected by the hinge mechanism (coupling mechanism), it is possible to apply the present invention to other types of mobile phones.

For example, first and second shells 1 and 2 can be connected by a slidable coupling mechanism and, by setting the first and second shells to an overlaid state, only a touch pad alone can be placed in a usable state and, in addition, it is also possible to set the phone from this usable state to another usable state with an input device, such as function keys 4 and dial keys 6, exposed.

Although the mobile phone has been explained as using two shells, it is also possible to provide a mobile phone using, for example, three or more casings.

Although the posture deciding unit 23a has been explained as deciding two states, that is, a first posture state in which the first shell 1 with the touch pad 7 is in the normal direction and a second posture state in the reverse direction, it may be so designed as to decide any other posture states such as a right lateral direction and left lateral direction. According to the respective posture decided by the posture deciding unit 23a, the touch pad control unit 23e changes the allocation of processing (function) to be executed by an input operation on the positions on the touch pad 7.

Although the mobile phone has been explained as having a camera function done by the camera processing unit 23b and a music playback function done by the music playback unit 23c by way of example, it is possible to provide any other kinds of functions.

Although the mobile phone has been explained as detecting the posture of the first shell 1 by the gravity sensor 10a and deciding the operation type by the posture of the first cell 1, it may be possible to detect the operation type by other sensors. For example, a pressure sensor, etc., may be provided by which it is possible to detect a hand grip on the mobile phone so that it is possible to detect any proper finger positions on the hand grip of the phone by the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A portable terminal device, comprising:
    a first casing configured to hold a first input device;
    a second casing;
    a second input device configured to receive an input operation at a plurality of positions;
    a control unit configured to allocate a function to be executed, in response to the input operation, to each of the plurality of positions;
    a connection configured to couple the first casing and the second casing, the connection being operable between a first state in which the first casing and the second casing are exposed and a second state in which the first casing and the second casing are overlaid such that the second input device is exposed;
    a state detecting unit configured to detect between the first state and the second state; and
    a posture detecting unit configured to detect a posture of the first casing;
    wherein the control unit is configured to, when the second state is detected by the state detecting unit, allow the function allocated to each of the plurality of positions to be changed according to the posture of the first casing detected by the posture detecting unit, and is configured to, when the first state is detected by the state detecting unit, not allow the function allocated to each of the plurality of positions to be changed according to the posture of the first casing detected by the posture detecting unit.

2. The portable terminal device according to claim 1, wherein the second input device comprises a two-dimensional surface and is configured to input position information according to a position on the two-dimensional surface at which the input operation is performed.

3. The portable terminal device according to claim 1, wherein the control unit controls the function to be changed after a lapse of a pre-set given time following the detecting of a change in the posture of the first casing.

4. The portable terminal device according to claim 1, further comprising a management table configured to record the function corresponding to each position, and wherein the control unit changes the function corresponding to each position recorded on the management table.

5. The portable terminal device according to claim 1, further comprising an operation deciding unit configured to decide whether or not the input operation is being performed on the second input device; and
    a stop control unit configured to stop the changing of the function by the control unit during a time period in which the operation deciding unit decides that the input operation is being performed on the second input device.

6. The portable terminal device according to claim 1, further comprising a first display unit which is provided near the second input device, and which is configured to display function information representing the function allocated to at least one of the plurality of positions.

7. The portable terminal device according to claim 6, wherein the first display unit is configured to change the display position of the function information according to the change of the function allocated to the plurality of positions.

8. The portable terminal device according to claim 1, further comprising:
    a camera unit provided on the first casing;
    an image storing unit configured to store an image captured by the camera unit;
    a second display unit provided on the first casing;
    a posture information storing unit configured to store, in connection with the image stored in the image storing unit, posture information representing the posture detected by the posture detecting unit when the image was captured;
    an image changing unit configured to change a direction of the image according to both the posture detected by the posture detecting unit and the image information connected with the image as a display target stored in the image storing unit; and
    an image display control unit configured to display the image having the changed direction on the second display unit.

9. The portable terminal device according to claim 1, further comprising:
    a camera unit provided on the second casing;
    an image storing unit configured to store an image captured by the camera unit;
    a second display unit provided on the first casing;
    a posture information storing unit configured to store, in connection with the image stored in the image storing unit, posture information representing the posture detected by the posture detecting unit when the image was captured;
    an image changing unit configured to change a direction of the image according to both the posture detected by the posture detecting unit and the image information connected with the image as a display target stored in the image storing unit; and
    an image display control unit configured to display the image having the changed direction on the second display unit.

10. The portable terminal device according to claim 1, wherein the input device is a touch pad.

11. A portable terminal device, comprising:
    a connection configured to couple a first casing including a first input device and a second casing including a second input device, the connection being operable between a first state in which the first input device and the second input device are exposed and a second state in which the first casing and the second casing are overlaid to expose the second input device only;
    a state detecting unit configured to detect which of the first state and the second state the connection is in;
    a function allocating unit configured to allocate a function to be executed, in response to an input operation, to each of a plurality of positions of the second input device;
    a posture detecting unit configured to detect a posture of the first casing; and
    a function control unit configured to, when the second state is detected by the state detecting unit, change the function allocated to each of the plurality of positions according to the posture of the first casing detected by the posture detecting unit.

12. The portable terminal device according to claim 11, wherein the second input device comprises a two-dimensional surface and is configured to input position information according to a position on the two-dimensional surface at which the input operation is performed.

13. The portable terminal device according to claim 11, wherein the function control unit changes the function after a lapse of a given period of time after the posture detecting unit detects a change in the posture of the first casing.

14. The portable terminal device according to claim 11, further comprising an operation deciding unit configured to decide whether or not the input operation is being performed on the second input device; and a stop control unit configured to stop the changing of the function by the function control unit during a time period in which the operation deciding unit decides that the input operation is being performed on the second input device.

15. The portable terminal device according to claim 11, further comprising:

a display unit which is provided near the second input device; and a function display control unit configured to cause the display unit to display information representing the function allocated to each of the plurality of positions by the function allocating unit.

16. The portable terminal device according to claim 15, wherein the function display control unit controls the display unit to change display positions of the information representing the function allocated to each of the plurality of positions, in accordance with the change of the function allocated to each of the plurality of positions by the function control unit.

17. The portable terminal device according to claim 11, further comprising:

a camera unit provided on the first casing to capture an image;

an image storing unit configured to store the image captured by the camera unit;

a display unit provided on the first casing;

a posture information storing unit configured to store, in connection with the image stored in the image storing unit, posture information representing the posture detected by the posture detecting unit when the image was captured;

an image changing unit configured to change a direction of the image according to both the posture detected by the posture detecting unit and the posture information connected with the image as a display target stored in the image storing unit; and an image display control unit configured to cause the display unit to display the image whose direction has been changed by the image changing unit.

* * * * *